W. B. Kimball,
Sawing Stone.

N° 13,791.  Patented Nov. 13, 1855.

UNITED STATES PATENT OFFICE.

WM. B. KIMBALL, OF PETERBORO, NEW HAMPSHIRE.

MARBLE-SAWING MACHINE.

Specification of Letters Patent No. 13,791, dated November 13, 1855.

*To all whom it may concern:*

Be it known that I, W. B. KIMBALL, of Peterboro, in the county of Hillsboro, and State of New Hampshire, have invented a new and useful Machine for Sawing Marble Blocks in Polygonal Taper Form; and I do declare that the following is a full, clear, and exact description of the same, reference being had to the annexed drawings, making a part of this specification, in which—

Figure 1:
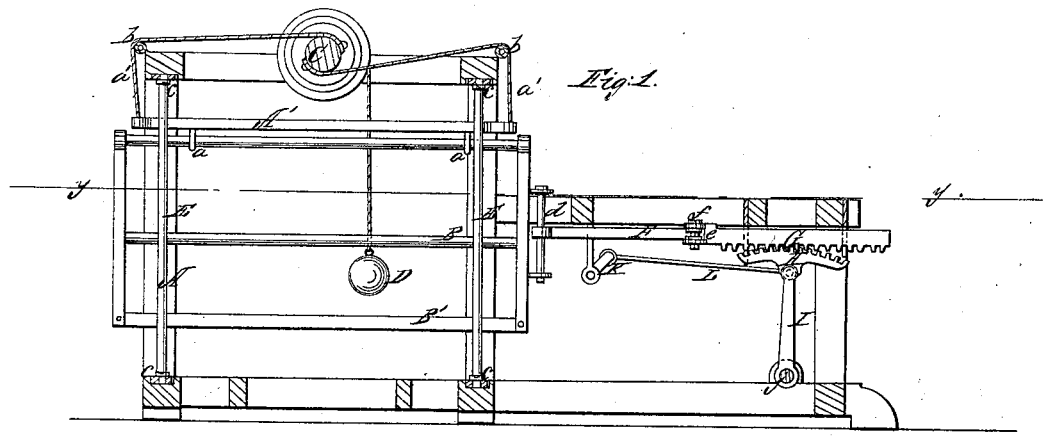
Figure 2:
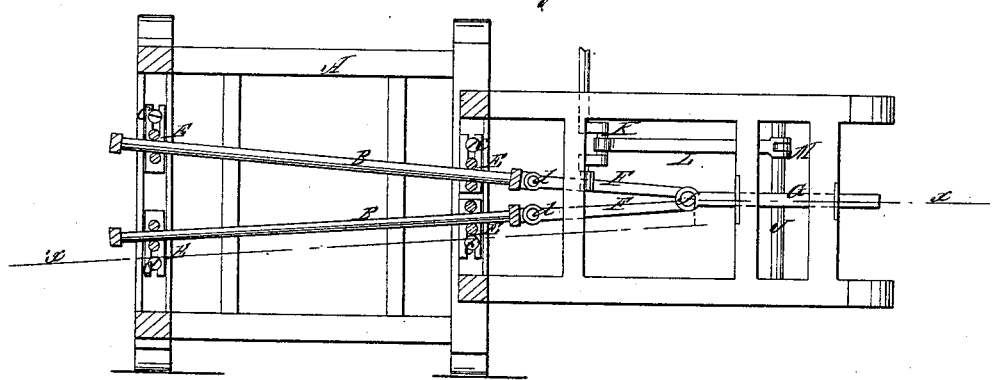

Figure 1, is a longitudinal vertical section of my improvement, $(x)$ $(x)$ Fig. 2, showing the plane of section. Fig. 2 is a horizontal section of ditto, $(y)$ $(y)$ Fig. 1, showing the plane of section.

Similar letters of reference indicate corresponding parts in the two figures.

The nature of my invention consists in a peculiar mode of driving the saws whereby two oblique saws may be driven from one crank or shaft.

To enable others skilled in the art to make and use my invention, I will proceed to describe its construction and operation.

A, represents a rectangular framing in which two vertical saw frames or gates B, B, are placed, said saw frames or gates working on hooks $(a)$ attached to the under sides of bars A′, which have ropes or chains $(a')$ attached to their ends, which ropes or chains pass over rollers $(b)$ $(b)$ on the upper part of the framing and are there attached to a transverse shaft C, provided with a counterpoise D, which serves to counter balance the saw frames or gates.

The ends of the saw frames or gates B, B, work between guides E, which are placed vertically in the framing A, and are secured thereto by set screws $(c)$ at their upper and lower ends, so that the guides may be moved in the framing and secured at desired points, and the saw frames or gates may consequently be placed obliquely with the sides of the framing A, and more or less so as may be desired see Fig. 2, B′, represent the saws at the lower parts of the frames B.

The front ends of the saw frames or gates B, B, have vertical rods $(d)$ attached to them on which rods the inner ends of pitman F, are fitted the rods passing through holes in the ends of the pitman.

The outer ends of the pitman F, are connected by a joint $(e)$ through which a pin $(f)$ passes, said pin also passing through the end of a bar G, in which the joint $(e)$ is fitted, the pin $(f)$ serving to connect the pitman with the bar G, and also serving as the pin of the joint $(e)$ connecting the outer ends of the pitman together.

The bar G, is cogged on its under surface, and a geared segment H, meshes into it, said segment being attached to an arm I, the lower end of which is attached to a rock shaft J, at the lower part of the framing A. The shaft J, is operated by means of a crank K, which is connected by a rod L, to the upper end of an arm M, attached to the shaft J.

Operation: The block of marble to be sawed is placed underneath the saws B′, and the guides E, are adjusted in the framing A, so that the two saw frames or gates B, B, will be placed in the proper oblique position to cut the sides of the marble block in the desired taper form. Motion is then given the crank K, in any proper manner, and a reciprocating movement is communicated to the segment H, and the bar G, is moved back and forth, and also the saw frames or gates B, B, and as the saw frames or gates B, B, are placed in an oblique position as shown, the two opposite sides of the marble block will be sawed in taper form.

The pitmen F, F, in consequence of being connected by the joint $(e_{)}$ at their outer ends are allowed to move laterally toward and from each other in order to correspond to the movement of the saw frames or gates, and the two saw frames or gates are therefore worked or driven from one crank.

The saws feed themselves to their work in consequence of the weight of the frames or gates B, B, the weight of the frames or gates or the pressure of the saws upon the block being regulated by the size or weight of the counter poise D.

When the opposite sides of the block are sawed the saws B′, and frames B, are elevated by turning the shaft C, and the block is turned underneath the saws properly "blocked up" and the remaining sides sawed.

Having thus described my invention, what I claim as new and desire to secure by Letters Patent, is,

Driving the saw frames or gates B, B, by means of the jointed pitmen F, F, and bar G, in combination with the geared segment H, and crank K, when arranged as shown and for the purpose set forth and not otherwise.

WM. B. KIMBALL.

Witnesses:
ALLEN BUCKMEISTER,
CHARLES SCOTT.